(12) United States Patent
Bund

(10) Patent No.: US 8,230,472 B2
(45) Date of Patent: Jul. 24, 2012

(54) CAMERA IMAGE TRANSMISSION

(75) Inventor: Carsten Bund, Los Angeles, CA (US)

(73) Assignee: Advanced Video Communications, Los Angeles, CA (US)

( * ) Notice: Subject to any disclaimer, the term of this patent is extended or adjusted under 35 U.S.C. 154(b) by 336 days.

(21) Appl. No.: 12/478,047

(22) Filed: Jun. 4, 2009

(65) Prior Publication Data

US 2010/0309318 A1    Dec. 9, 2010

(51) Int. Cl.
H04N 7/173 (2011.01)
H04N 5/225 (2006.01)
H04N 5/232 (2006.01)
G06F 15/173 (2006.01)

(52) U.S. Cl. .......... 725/105; 348/207.1; 348/211.1; 348/211.5; 709/225

(58) Field of Classification Search .......... 725/105; 348/207.1, 207.11, 211.99–211.6, 211.11–211.13; 709/225
See application file for complete search history.

(56) References Cited

U.S. PATENT DOCUMENTS

| | | | | |
|---|---|---|---|---|
| 5,956,482 | A * | 9/1999 | Agraharam et al. | 709/203 |
| 6,353,848 | B1 * | 3/2002 | Morris | 709/203 |
| 6,567,122 | B1 * | 5/2003 | Anderson et al. | 348/211.3 |
| 6,930,709 | B1 * | 8/2005 | Creamer et al. | 348/211.3 |
| 7,222,357 | B2 * | 5/2007 | Anderson et al. | 725/105 |
| 7,340,766 | B2 * | 3/2008 | Nagao et al. | 725/105 |
| 2003/0182363 | A1 | 9/2003 | Clough | |
| 2005/0216580 | A1 | 9/2005 | Raji | |
| 2006/0161960 | A1 | 7/2006 | Benoit | |
| 2007/0091177 | A1 | 4/2007 | West | |

OTHER PUBLICATIONS

"Ultra Low Bandwidth, Boundless Security System with Tunneling Option Works on Wired, Wireless and Dialup Networks That Block Uploads by Other Digital Video Surveillance Systems" from Boundless Security Systems, Inc. dated Feb. 5, 2008.*

* cited by examiner

Primary Examiner — Daniel M Pasiewicz
(74) Attorney, Agent, or Firm — Foley & Lardner LLP

(57) ABSTRACT

A data and image transmission system includes at least one interactive control server system, coupled to a communications network, to which a user may connect for interactive communication to at least one remote image-data acquisition system located behind a communications security firewall. The image-data acquisition system includes a tunnel client, and the interactive control server system includes a active connection to enable the interactive control server system and the image-data acquisition system to transmit and receive communications through the firewall. A set of rules and the operational specifications of the image-data acquisition system, operable on the interactive control server system, determine how the data from the image-data acquisition system is provided to the interactive control server system. Conflicts between the data received from the image-data acquisition system and the data requested by the user are resolved by a set of prioritizing rules to determine the data transmitted to the user.

25 Claims, 2 Drawing Sheets

CAMERA IMAGE TRANSMISSION

TECHNICAL FIELD

The present invention generally relates to data transmission. More specifically, the present disclosure relates to systems and methods for transmitting images and data over a communications network through a communications security firewall.

BACKGROUND

In secure communications via networks, such as the internet, it is desirable to protect computer systems and other devices from invasion by computer virus, data theft, data damage, and the like, and to protect data to be transmitted securely. A variety of methods and systems are available to provide such protection, such as encryption and firewalls.

In some circumstances, however, it is desirable to provide such protection generally, while enabling authorized communicating parties to permit access to and control of the otherwise protected computer systems and other devices to accomplish a task.

There is a need to enable access to and control of devices protected by security systems (e.g., a communications security firewall) by remote authorized users, in order to obtain specific data, while preventing access to such devices by unauthorized users.

SUMMARY

A data and image transmission system includes at least one interactive control server system, coupled to a communications network, to which a user may connect for interactive communication with at least one remote image-data acquisition system, where the remote image-data acquisition system is located behind a communications security firewall. The image-data acquisition system further includes a tunnel client, and the interactive control server system includes a tunnel client connection to enable the interactive control server system and the image-data acquisition system to transmit and receive communications through the firewall. A set of rules and the operational specifications of the image-data acquisition system, operable on the interactive control server system, determine how the data from the image-data acquisition system is provided to the interactive control server system. Conflicts between the data received from the image-data acquisition system and the data requested for presentation by the user are resolved by a set of prioritizing rules to determine the data transmitted to the user.

In an embodiment, an image-data acquisition system is coupled to a communications network. The image-data acquisition system provides a first specified data to an interactive control server system. The interactive control server system may be accessed by a user for acquiring a second specified data based on the first specified data. The image-data acquisition system includes a unique identifying information. The image-data acquisition system includes a dynamic domain name server (DNS) coupled to the communications network operable to periodically transmit an identifier message including at least the unique identifying information. The image-data acquisition system is coupled to the communications network through a communications tunnel, where the communications tunnel is established on the basis of the transmitted unique identifying information. The communications tunnel allows data and commands to be received by and transmitted from the image-data acquisition system through the communications security firewall. The firewall prevents data and commands from being otherwise received by the image-data acquisition system over the communications network. The image-data acquisition system includes a tunnel client coupled to the communications network to communicate through the firewall to receive and transmit data through the communications tunnel.

In an embodiment, an interactive control server system includes a memory to store at least a portion of the first specified data. The interactive control server system further includes a user database stored in the memory to maintain a list of prior approved users to determine if the user is an approved user. The interactive control server system further includes a web application to exchange information with the approved user over the communications network. The interactive control server system further includes a device database stored in the memory to maintain a list of prior approved image-data acquisition systems ("approved devices") allowed to communicate with the interactive control server system, the image-data acquisition system device database including the operational specifications of the approved devices. The interactive control server system further includes a device dynamic domain name server (DNS) to receive identifier messages from the approved device over the communications network. The interactive control server system further includes an active connection to the tunnel client to transmit to and receive from the approved device over the communications network, formatted data, wherein the approved device is coupled to the communications network from behind a communications security firewall. The interactive control server system further includes a video server to transmit the second specified data reformatted for presentation to the approved user over the communications network.

The foregoing has outlined rather broadly the features and technical advantages of the present disclosure in order that the detailed description that follows may be better understood. Additional features and advantages will be described hereinafter which form the subject of the claims of the disclosure. It should be appreciated by those skilled in the art that the conception and specific embodiments disclosed may be readily utilized as a basis for modifying or designing other embodiments for carrying out the same purposes of the present disclosure. It should also be realized by those skilled in the an that such equivalent constructions do not depart from the technology of the disclosure as set forth in the appended claims. The novel features which are believed to be characteristic of the disclosure, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

For a more complete understanding of the present invention, reference is now made to the following description taken in conjunction with the accompanying drawings.

DETAILED DESCRIPTION

In the following, the term "data and image transmission system" is represented, for convenience, by the term "camera image transmission system" without loss of generality. The term "image-data acquisition system" is represented by the term "camera image transmission system" without loss of generality.

Figure 1:
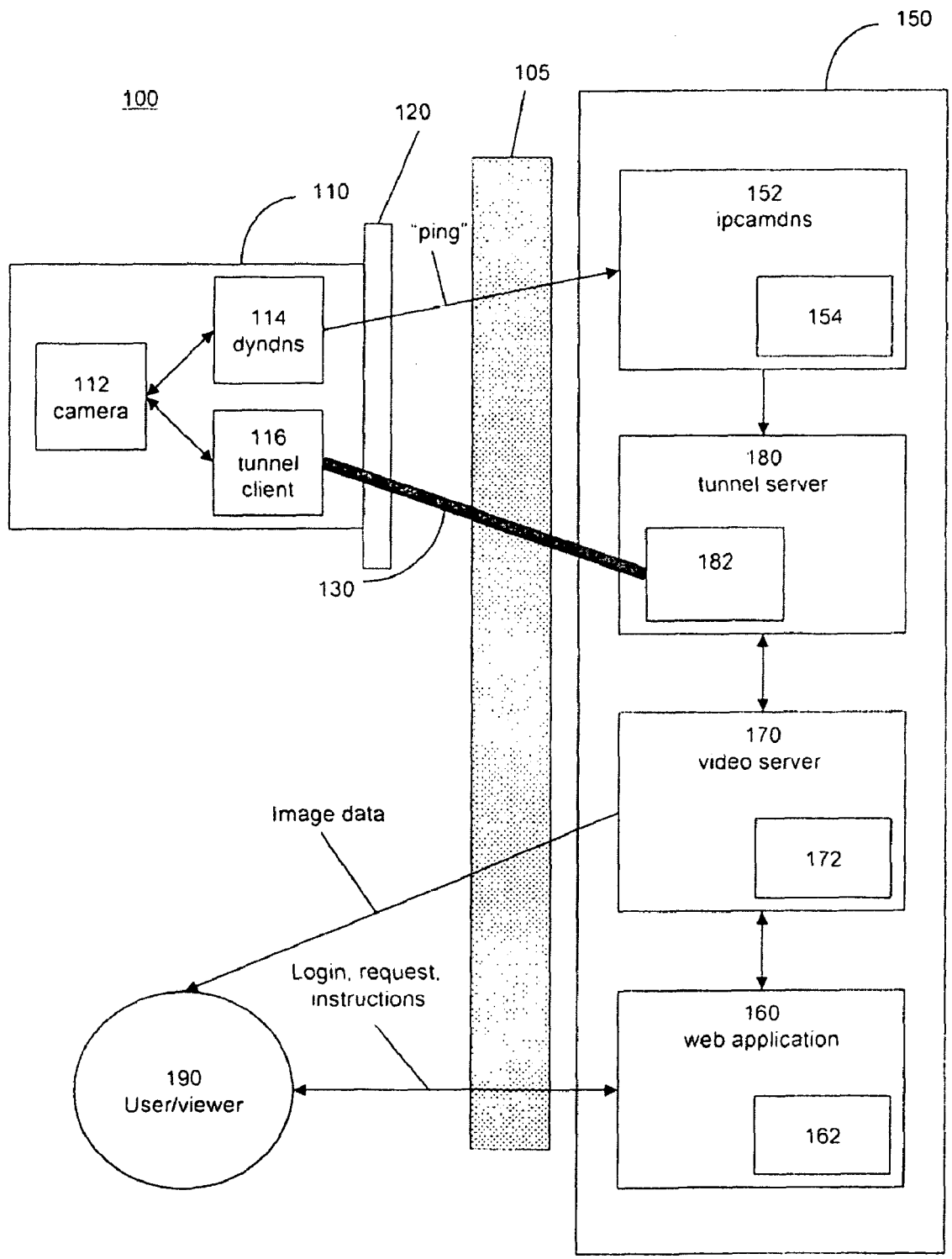
FIG. 1 depicts a data and image transmission system according to the disclosure.
Figure 3:
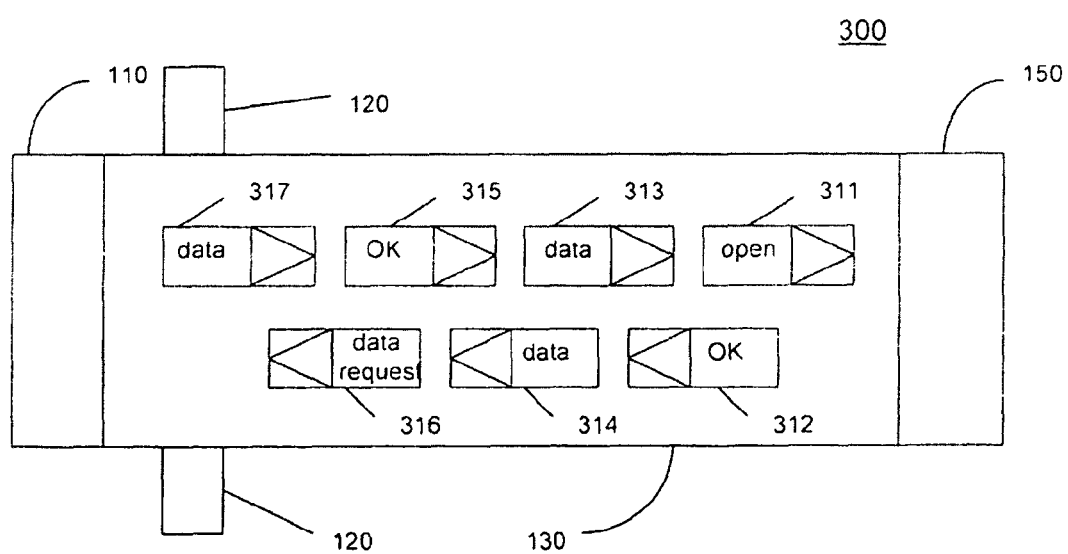
FIG. 3 depicts an exemplary session showing transmission of tunnel data packets through a tunnel according to the disclosure.

Referring to FIG. 1 3, a camera image transmission system 100 is described in which a camera system (IPeam 110) capable of communication over a communications network 105 operating through a secure connection (such as, for example, from behind a firewall 120), can be controlled interactively by a remote user/viewer 190 through a communications tunnel 130 by interacting through an interactive control server system 150. Whereas exemplary embodiments are described in terms of a camera system IPeam 110 and communication may be described as occurring over the internet. IPeam 110 may more generally refer to various types of data acquisition systems ("image-data acquisition system"), such as audio detectors, environmental detectors, or any type of sensor, and communication may occur over any type of equivalent communications network without altering the intent of the disclosure.

FIG. 1 depicts the camera image transmission system 100 that includes the communications network (e.g., "internet") capable camera IPeam 110, which communicates with the interactive control server system 150. The user/viewer 190 may communicate interactively with the IPeam 110 only through the interactive control server system 150. The IPeam 110 communicates from behind a firewall 120 (or equivalent communications security system) to access the internet. The firewall 120 is described herein for exemplary purposes only. Other means of providing security and protection of devices such as the IPeam 110 may be used without altering the intent of the disclosure.

The IPeam 110 includes, for example, a commercially available camera 112 (e.g., a digital audio/video or still camera), a dynamic domain name server (DNS) dyndns 114, and a tunnel client 116. The tunnel client 116 will be discussed in more detail below. The dyndns 114 is a protocol or network service that enables the IPeam 110 to address and transmit messages to other devices participating in the internet 105 such as, for example, the interactive control server system 150. Tunnel clients and dynamic domain name servers are well known in the art. For example. U.S. Pat. No. 7,321,598 discloses use of a network tunnel client.

The IPeam 110 may be identified, for example, by a Media Access Control (MAC) address and serial number (S/N), uniquely assigned at the time of manufacture. This identifying information may be provided to and stored in the interactive control server system 150, as described below in more detail, to register the IPeam 110 as an approved device for use in the camera image transmission system 100.

When connected to the internet 105 and provided with power, the IPeam 110, via the dyndns 114, autonomously and periodically transmits ("pings") an identifier message that is received and recognized by the interactive control server system 150. The identifier message may include certain identification information for the IPeam 110, e.g., the MAC address and the S/N and, optionally, additional identification information, as desired.

The interactive control server system 150 includes a dynamic domain name server IPeamdns 152. The IPeamdns 152 includes a database table camdatabase 154 that stores registration information of all approved IPeams 110, where such registration information is provided separately (e.g., from an approved manufacturer) to the camdatabase 154, before the IPeam 110 becomes active and couples to the internet 105. The "ping" transmitted by the dyndns 114 of IPeam 110 is received by the IPeamdns 152. By comparing the identification information in the transmitted "ping" to registration information of IPeams 110 stored in the camdatabase 154, the interactive control server system 150 determines if the transmitting device is one of the approved IPeams 110, and now recognizes that the IPeam 110 is available for operational use. The camdatabase 154 may additionally receive and store status data (e.g., active, inactive, available, etc.) from the IPeam 110 contained in the identifying information. The camdatabase 154 may further include access data, provided separately, that determines which users/viewers 190 may access which IPeams 110.

The information in the camdatabase 154 enables the interactive control server system 150 to allow service only to registered equipment. The list may be updated and include more IPeams 110 as they become available and are approved to communicate with approved users/viewers 190. Additional information may be stored in the camdatabase 154 as required, for example, additional information may include the physical location, owner, lessor, lessee, and the like, of the IPeam 110.

A user/viewer 190, operating from a computer or other internet capable communications device at a location remote from the IPeam 110 can log onto the interactive control server system 150 for the purpose of viewing data, such as a camera feed, from a selected IPeam 110 as described below.

The interactive control server system 150 includes a web application 160. The user/viewer 190 logs on to the web application 160. The logon may be via a conventional link such as the internet 105. The web application 160 accesses a stored user database 162. The user database 162 maintains login identifiers for each user/viewer 190 and is relational in that the user database 162 may include a list of which one or more of the IPeams 110 the user/viewer 190 may access and interact with. The user database 162 determines whether a subject attempting to log into the interactive control server system 150 is a valid user/viewer 190.

The web application 160 may be one of a plurality of web applications 160 included in the interactive control server system 150, where the plurality of web applications 160 may be geographically distributed at one or more locations to reduce network latency delays that may exist, or a plurality of web applications 160 may be desirable to handle a large number of user/viewers 190 to reduce a bandwidth limited induced latency.

After the user/viewer 190 is logged on, the web application 160 provides the user/viewer 190 with successive menu driven choices (e.g., as webpage windows using hypertext Markup Language (HTML)) for the purpose of making a request to specify and receive data ("image-data"). The request may include, for example, specifying from which IPeams 110 to provide image-data, instructions for controlling the IPeams 110 (such as pan, zoom, frame rate, and the like), and instructions to store or retrieve stored image date from the interactive control server system 150.

As mentioned above, the user/viewer 190 may establish interactive access with a particular IPeam 110 by satisfying inputs required in each of the successive web pages for login, IPeam selection, requests for video service, camera control scripts, and the like. Once the user/viewer 190 has been approved by the web application 160 to have access to one or more of the IPeams 110, a communication channel must be established between the user/viewer 190 and the IPeam 110. Since the IPeam 110 may operate, for example, from behind a firewall 120, commands may not be transmitted to the IPeam 110 directly from the user/viewer 190 or from the interactive control server system 150 via the IPeamdns 152 (which is capable of recognizing identifier messages pinged by the IPeam 110, and maintaining a current camdatabase 154) and the dyndns 114 because of firewall 120 restrictions.

To enable access to, and control of, the IPeam 110 through the firewall 120, the IPeam 110 includes a tunnel client 116 to establish a communications channel tunnel 130, hereinafter referred to as a tunnel 130. An example of firewall tunneling is Hypertext Transfer Protocol (HTTP) tunneling, a technique by which communications performed using various network protocols are encapsulated using the HTTP protocol, the network protocols in question usually belonging to the TCP/IP family of protocols. The HTTP protocol therefore acts as a wrapper for a covert channel that the network protocol being tunneled uses to communicate. This enables two-way communication through the firewall 120. The HTTP tunnelling technique is exemplary, and other techniques to achieve the same result may be used. The Ipeam 110 uses the software application tunnel client 116, and the server side interactive control server system 150 software application is an active connection 182 resident on a tunnel server 180 for communication to the tunnel client 116. Bi-directional communication can take place through the tunnel 130 between the tunnel client 116 and the tunnel server 180 via the active connection 182. The nature of packet data transmission through the tunnel 130 will be discussed in more detail below.

When the IPeam 110 is approved for use by a user/viewer 190, and the user/viewer 190 makes a request to receiver image-data from the IPeam 110, the tunnel 130 is established between the tunnel client 116 and the active connection 182. Once the tunnel client is aware that the tunnel 130 is established, data packets 200 may be exchanged bi-directionally between the IPeam 110 and the interactive control server system 150.

Figure 2:
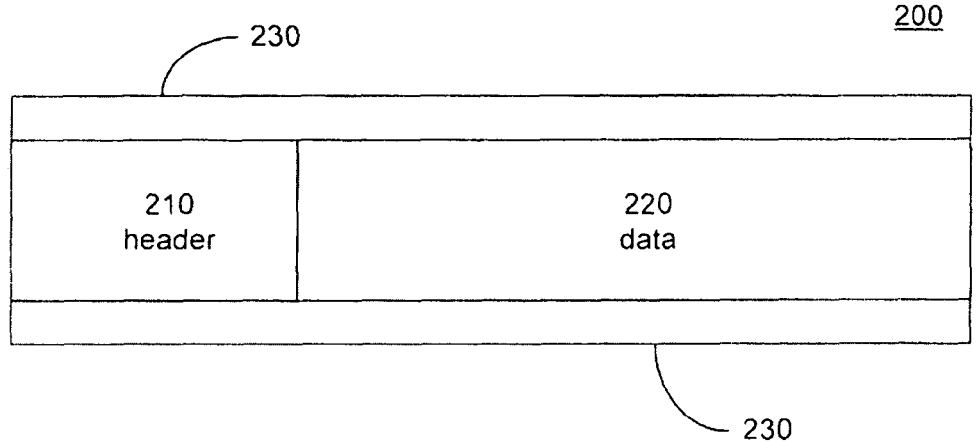
FIG. 2 depicts a representative tunnel data packet according to the disclosure.

FIG. 2 depicts a representative tunnel data packet 200. The tunnel data packet 200 includes a header portion 210, a data portion 220 containing, for example, request commands or video data, and, for example, an HTTP tunnel protocol wrapper 230 to enable covert tunnel communication. Other methods and data packaging for tunnel transmission may be contemplated that satisfy the requirements of transmitting data and commands through the firewall 120.

FIG. 3 depicts an example of a session of transmission operation 300 through a tunnel 130, as shown in FIG. 1. Referring now to FIGS. 1 and 3, alter the IPeam 110 has registered its identity and availability with IPeamdns 152, a plurality of tunnel data packets e.g., 311-317, may be transmitted. The data packets 311-317 can be transmitted in either direction between the IPeam 110 and the interactive control server system 150 as described below.

The IPeam 110 tunnel client 116 transmits a first data packet 311 ("open") to the tunnel server 180 in the interactive control server system 150 to confirm that the tunnel 130 is open and communication is available. Data sent from the tunnel server 180 of the interactive control server system 150 to the IPeam 110 are provided by the active connection 182, and travel through the tunnel 130, following, for example, the protocol described above.

The active connection 182, operating on the tunnel server 180, returns a confirming tunnel data packet 312 ("OK") toward the IPeam 110. The IPeam 110 may then respond, for example, by transmitting a tunnel data packet 313 ("data") containing its identifier information, such as the manufacturer defined MAC address and S/N. In response, the active connection 182, after referencing the camdatabase 154 or an internal server database 184 that may, for example, be adapted from the camdatabase 154 and/or the user database 162, replies with a tunnel data packet 314 ("data") that either acknowledges that the IPeam 110 is properly registered (such as by verifying, for example, that the IPeam 110 is located) and properly identified in one or more of the appropriate databases in the interactive control server system 150 and can further communicate, or may reply that an error has been detected, such as an unregistered camera that may not access the interactive control server system 150.

If the tunnel data packet 314 ("data") indicates that IPeam 110 is recognized, the IPeam 110 may respond with a confirming recognition tunnel data packet 315 ("OK") that it, too, recognizes the interactive control server system 150 and is ready to receive requests and/or commands. The tunnel server 180 may then issue a tunnel data packet 316 ("data, request") containing a request or operational command, as described above. The IPeam 110 may respond by returning, for example, a tunnel data packet 317 ("data") containing data confirming the requested operation is accomplished, video data or other relevant data response to the request. The alternating exchange of data packets through the tunnel continues until the session is terminated. The session may be terminated by the user/viewer 190 in various ways, for example, including a real time termination, or a scripted termination, as established when the user/viewer 190 initially communicated with the web application 160. The bi-directional data exchange described above is exemplary, and variations of the exchange to accomplish substantially the same outcome are equivalent in accordance with the disclosure.

Referring to FIGS. 1 and 3, the web application 160 then provides the user/viewer 190 with options for selecting and controlling the IPeam 110 and for requesting video data to be returned by transmission through the tunnel 130. On a control web page, for example, various camera control commands may be defined, or selected from a list. This may include, for example, orienting the camera to view one or more locations within the camera line-of-sight, zoom, length of time to dwell on each view, and various other commands. Other types of commands, for example, may include transmitting video data of each view for a selected dwell time, storing the data, specifying limits on data retention, transmitting video data only when motion is detected, and the like. Such commands are exemplary, and not limiting to the possible types and combinations of command and data requests that may be contemplated.

The commands are passed from the web application 160 to a video server 170 in the interactive control system 150. The video server 170 stores and maintains a camera specification table 172, which defines the operational specifications of each IPeam 110 accessible from the interactive control system 150. The video server 170 constructs camera operation commands according to the operational specifications of the camera 112 within the IPeam 110, including commands requesting return of data and processing thereof, such as storage. The camera specification table 172 may be linked to the camdatabase 154 and/or the user database 162, since some information may be commonly and usefully shared.

Commands generated by the video server 170 are then forwarded to the tunnel server 180, where the commands are embedded in data packets constructed for transmission through the tunnel 130. The camera tunnel client 116 interprets or decodes the embedded commands and controls the operation of the camera 112. The camera tunnel client 116 also embeds video data in data packets for transmission through the tunnel 130 back to the tunnel server 180.

The returned video data received by the tunnel server 180 may then be decoded from the data packets and reformatted, for example, in M-JPEG format, and transmitted to the user/viewer 190. (The Moving Picture Experts Group M-JPEG format is a standard for audio and video compression and transmission). The software application to perform this reformatting and transmission to the user/viewer 190 may be, for example, resident in the web application 160, video server 170, or tunnel server 180, or elsewhere in the interactive control server system 150 depending on various constraints, such as, for example, storage capacity and/or inter-server bandwidth capacity of the servers (either internal or external to the interactive control server system 150).

One can appreciate that video and image-data are not the only forms of information that may be transmitted in this manner. Audio waveforms may be transmitted, either separately or associated with video from the IPeam 110. In that case, the IPeam 110 may be equipped with audio pick-up capability. The audio waveform may be encoded in packets and transmitted through the tunnel 130. Additionally, the IPeam 110 may include an audio output capability, so that audio data can be sent to the IPeam 110, just as with other data and commands. Audio data may include voice commands, alarms, music, and the like.

The IPeam 110 may be configured for non-video data collection, which may be accessed as described above. For example, environmental information may be obtained by a variant of the IPeam 110 adapted to collect such data for transmission upon request or under control of a directed script provided by the user/viewer 190. Examples of such data may include remotely monitored radiation and well logging sensor data from remote oil or natural gas fields. The examples given are not intended to be limiting to the adapted configurations and uses of the system 100.

Although the present disclosure and its advantages have been described in detail, it should be understood that various changes, substitutions and alterations can be made herein without departing from the intent of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure, processes, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of mailer, means, methods, or steps.

What is claimed is:

1. An interactive control server system coupled to a communications network for receiving first image data from a remote device and transmitting second image data that corresponds to the first image data to a user device over the communications network, the interactive control server system comprising:
    a web application server to receive, from the user device, instructions for operating the remote device;
    a device server to receive an identifier message from the remote device;
    a tunnel server to establish, based on the identifier message, a communication tunnel with the remote device through a firewall associated with the remote device, the tunnel server configured to transmit the instructions to the remote device via the communication tunnel, the tunnel server configured to receive at least a portion of the first image data from the remote device through the communication tunnel based on the instructions;
    a memory to store the at least a portion of the first image data received from the remote device through the communication tunnel; and
    a video server to format the at least a portion of the first image data stored in the memory into the second image data and to transmit the second image data to the user device over the communications network.

2. The interactive control server system of claim 1, wherein the instructions comprise at least one or more commands to control the remote device, the first image data to be received, and format of the second image data to be transmitted to the user device.

3. The interactive control server system of claim 2, further comprising:
    a specification table to convert the instructions to operational instructions specific to the remote device, wherein the tunnel server is operable to convert the operational instructions to a data format suitable for transmission through the communication tunnel to the remote device through the firewall.

4. The interactive control server system of claim 1, further comprising:
    a set of rules to determine how the first image data is received by the interactive control server system.

5. The interactive control server system of claim 4, wherein conflicts between the first image data received from the remote device and the second image data transmitted to the user device are resolved by the rules to determine how the second image data is transmitted to the user device.

6. The interactive control server system of claim 1, wherein the firewall prevents any data from being transmitted from the user device to the remote device other than the instructions sent from the interactive control server system through the communication tunnel.

7. The interactive control server system of claim 1, wherein the tunnel server terminates the communication tunnel if the identifier message does not match an approved identifier message stored on the interactive control server system.

8. The interactive control server system of claim 1, wherein the device server, the tunnel server, the memory, and the video server are incorporated into a single housing.

9. The interactive control server system of claim 1, wherein the communication tunnel is established between the interactive control server system and the remote device in response to a request from the user device.

10. The interactive control server system of claim 1, wherein the communication tunnel remains open if an identifier received, through the communication tunnel, from the remote device matches the identifier message.

11. The interactive control server system of claim 1, wherein the at least a portion of the first image data is received through the communication tunnel and stored in the memory only in response to the instructions transmitted to the remote device.

12. The interactive control server system of claim 1, wherein the at least a portion of the first image data is received through the communication tunnel, stored in the memory, and formatted into the second image data only in response to the instructions transmitted to the remote device.

13. The interactive control server system of claim 1, wherein the tunnel server establishes the communication tunnel with the remote device only in response to the instructions transmitted to the remote device.

14. A method of receiving, at an interactive control server system coupled to a communications network, first image data from a remote device and transmitting second image data to a user device, the method comprising:
   receiving instructions for operating the remote device from the user device;
   receiving an identifier message from the remote device;
   establishing, based on the identifier message, a communication tunnel with the remote device through a firewall associated with the remote device;
   transmitting the instructions to the remote device via the communication tunnel;
   receiving at least a portion of the first image data from the remote device through the communication tunnel based on the transmitted instructions;
   storing in a memory the at least a portion of the first image data received from the remote device through the communication tunnel;
   formatting the at least a portion of the first image data stored in the memory into the second image data; and
   transmitting the second image data to the user device over the communications network.

15. The method of claim 14, wherein the instructions comprise at least one or more commands to control the remote device, the first image data to be received from the remote device, and the second image data to be transmitted to the user device.

16. The method of claim 15, further comprising:
   storing a specification table for converting the instructions to operational instructions specific to the remote device, wherein a tunnel server of the interactive control server system is operable to convert the operational instructions to a data format suitable for transmission through the communication tunnel to the remote device through the firewall.

17. The method of claim 14, further comprising:
   providing a set of rules for determining how the first image data is received at the interactive control server system.

18. The method of claim 17, further comprising:
   resolving conflicts between the first image data received from the remote device and the second image data transmitted to the user device based on the rules to determine how the second image data is transmitted to the user device.

19. The method of claim 14, further comprising:
   closing the communication tunnel if the identifier message does not match an approved identifier message stored on the interactive control server system.

20. The method of claim 14, wherein establishing, based on the identifier message, a communication tunnel with the remote device through a firewall associated with the remote device comprises:
   receiving, through the communication tunnel, a query from the remote device to determine whether the communication tunnel is open for transmitting the instructions to the remote device;
   sending, through the communication tunnel, an acknowledgement to the remote device that the communication tunnel is open;
   receiving, through the communication tunnel, an identifier from the remote device; and
   sending, through the communication tunnel, an acknowledgement to the remote device that the remote device is approved to receive the instructions if the identifier matches the identifier message.

21. An image-data acquisition system coupled to a communications network for providing first image data to an interactive control server system to be accessed by a user device for acquiring second image data corresponding to the first image data, the image-data acquisition system comprising, comprising:
   a unique identifying information associated with the image-data acquisition system;
   a server coupled to the communications network operable to periodically transmit an identifier message including at least the unique identifying information to the interactive control server system via the communications network; and
   a tunnel client to establish a communication tunnel, based on the identifier message, with the interactive control server system through a firewall associated with the image-data acquisition system, the tunnel client to receive, from the interactive control server system through the communication tunnel, instructions provided by the user device, the tunnel client to transmit, based on the instructions, at least a portion of the first image data to the interactive control server system through the communication tunnel for storage and reformatting into the second image data by the interactive control server system.

22. The image-data acquisition system of claim 21, wherein the communications network comprises the internet.

23. The image-data acquisition system of claim 21, wherein the communications tunnel is a Hypertext Transfer Protocol tunnel.

24. A method of providing over a communications network first image data from an image-data acquisition system to an interactive control server system to be accessed by a user device for acquiring second image data corresponding to the first image data, the method comprising:
   associating a unique identifying information with the image-data acquisition system;
   transmitting periodically from the image-data acquisition system an identifier message including at least the unique identifying information, to the interactive control server system via the communications network;
   establishing a communication tunnel, based on the identifier message, with the interactive control server system through a firewall associated with the image-data acquisition system;
   wherein instructions provided by the user device to the interactive control server system are received by the image-data acquisition system from the interactive control server system through the communication tunnel; and
   wherein at least a portion of the first image data is transmitted by the image-data acquisition system to the interactive control server system through the communication tunnel for storage and reformatting into the second image data by the interactive control server system.

25. The method of claim 24, the method further comprising:
   providing the first image data from at least one of a digital video camera and a digital still camera.

* * * * *